March 12, 1968 — A. VAN DER LELY — 3,372,842
DEVICES FOR SPREADING LIQUIDS
Filed Feb. 15, 1966 — 5 Sheets-Sheet 1

INVENTOR
ARY VAN DER LELY
BY
Mason, Mason & Albright
Attorneys

March 12, 1968     A. VAN DER LELY     3,372,842
DEVICES FOR SPREADING LIQUIDS
Filed Feb. 15, 1966     5 Sheets-Sheet 2
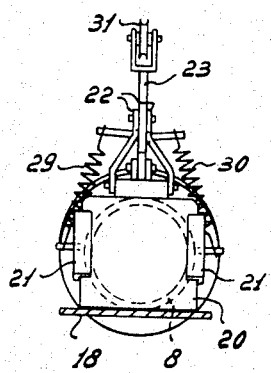
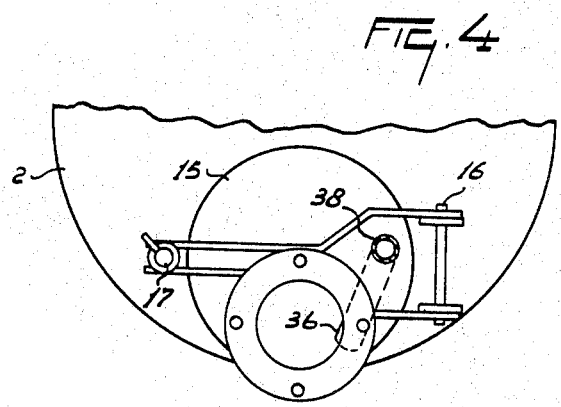
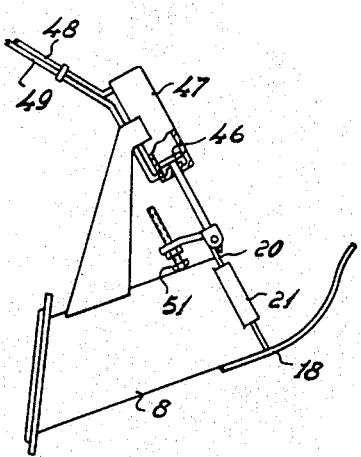
INVENTOR
ARY VAN DER LELY
BY
Mason, Mason & Albright
Attorneys

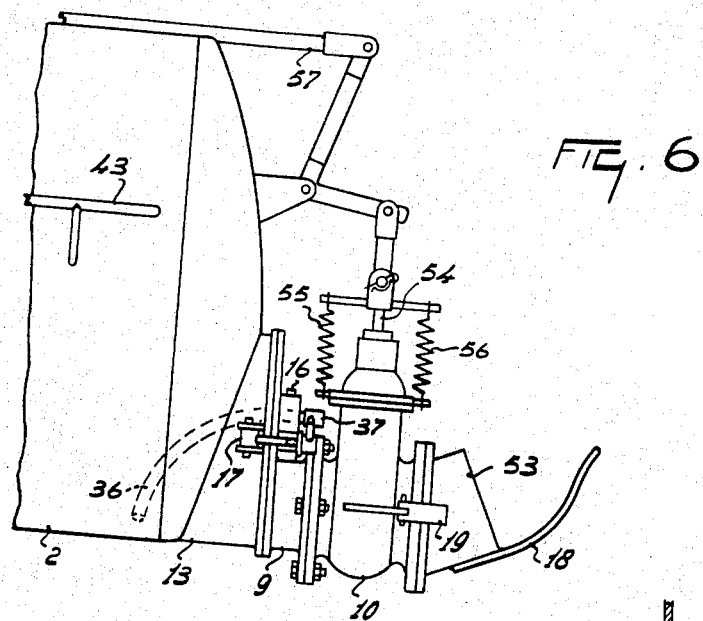
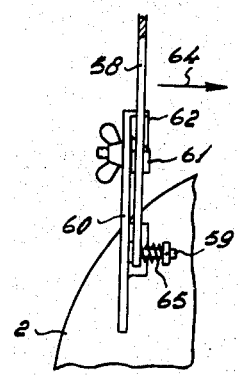
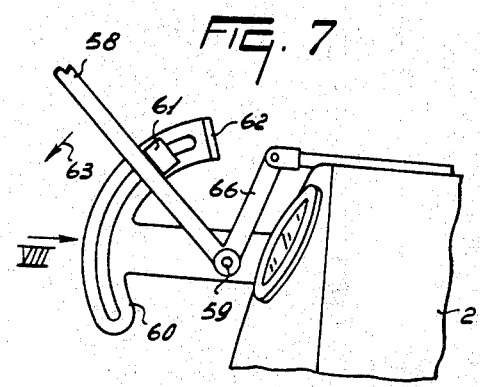

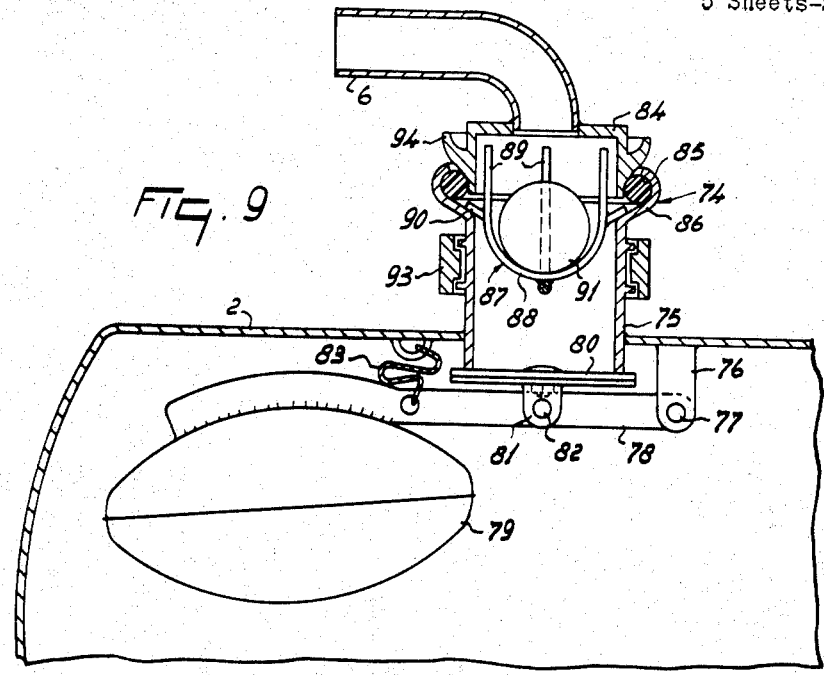

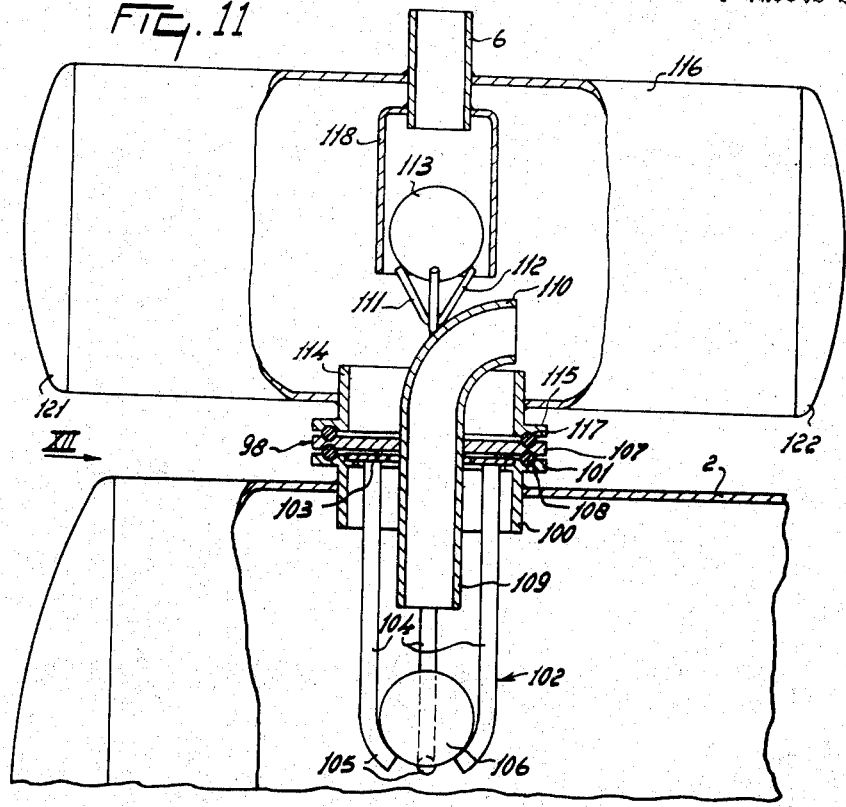
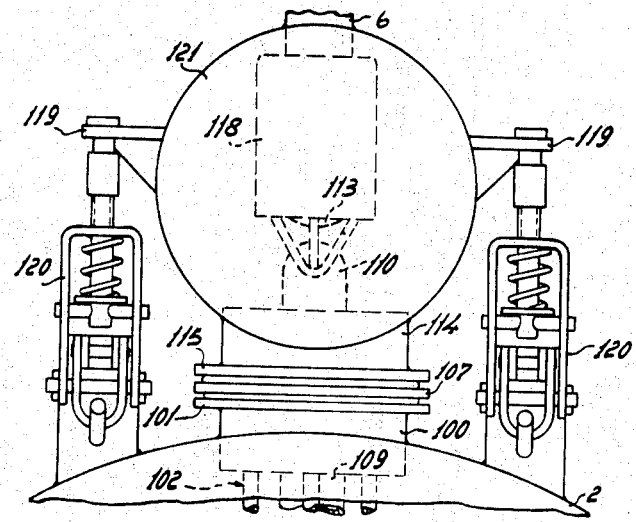

United States Patent Office 3,372,842
Patented Mar. 12, 1968

3,372,842
DEVICES FOR SPREADING LIQUIDS
Ary van der Lely, 10 Weverskade,
Maasland, Netherlands
Filed Feb. 15, 1966, Ser. No. 527,555
Claims priority, application Netherlands, Mar. 5, 1965,
65—2,788
41 Claims. (Cl. 222—156)

ABSTRACT OF THE DISCLOSURE

The invention relates to a device for distributing liquids, particularly thick liquids, comprising a liquid container and a distributor which is connected with the container and to which the liquid is fed out of the container. An outlet on the container has a closing member which can be opened more or less by an adjusting mechanism. A quick action control member is connected to the closing member so that the opening can be completely opened to prevent clogging. A suction hose can be connected to the outlet and a pump on the container is used to vary the pressure in the container. A float arrangement can be used to shut off suction if clogging occurs.

---

The invention has for its object inter alia to provide a device of the kind set forth, which is capable of distributing the liquid in a uniform manner.

According to the invention this can be achieved by providing a closing member between the container and the distributor, by means of which member the quantity of liquid to be delivered per unit time can be controlled, the device comprising an adjusting mechanism for holding the closing member at will in one of a plurality of positions and which comprises a quick-actuating member by which the closing member can be moved out of the selected position into the position of full passage and back into the selected position. This permits of distributing the material uniformly, since in the event of clogging in front of the closing member the latter can be quickly opened and returned to a given position. The liquid can thus be fed constantly to the distributor.

A simple embodiment is obtained by connecting the closing member in the form of a slide pivotally with a lever, which is urged against an adjustable stop by the action of a member exerting a force.

In a further embodiment of the device according to the invention the member exerting a force comprises a cylinder in which a piston is arranged, which is connected with the closing member, the cylinder communicating on either side of the piston with a pump, which is capable of pumping air through a cock system at will to one side or to the other side of the piston into the cylinder. In an advantageous embodiment of the device according to the invention the container is provided with an auxiliary outlet through which liquid can be conducted away from the container. The device can thus be employed in a simple manner, for example for spraying water or air, for cleaning some objects or for loosening liquid manure in a pit.

The invention relates further to a device comprising a container, a suction mechanism and a delivery member, wherein according to the invention the device is provided with a safety member between the suction mechanism and the container, said member comprising a closing member and a control-member, the latter being such that it actuates the closing member for cutting off the suction path to the container, when the material in the container reaches the suction path connected with the container.

A simple embodiment of the device according to this further invention is obtained by providing the control-member with a float, which floats on the liquid when it comes into contact herewith and which urges the closing member against the inlet port of a suction duct.

According to a further aspect of the invention the second closing member comprises a safety member arranged between the suction mechanism and the first closing member. If the first closing member does not provide a complete closure, the suction duct will be cut off by the second closing member. Particularly when liquid containing impurities is sucked in, it is advantageous that the second closing member is capable of cutting off the suction duct, when the first closing member is clogged. In a further embodiment of the device according to the invention an auxiliary container is arranged between the suction duct and the first closing member.

According to a further aspect the suction duct may comprise a first portion, while between this first portion and the further portion of the suction duct the second closing member is arranged, while the end of the first portion of the suction duct located near the second closing member is bent over away from the first closing member.

For a better understanding of the invention and to show how the same may be carried into effect, reference is made by way of example to the drawing, which shows a few embodiments.

FIG. 3 is an elevation of the closing member of the outlet pipe viewed in the direction of the arrow III in FIG. 2.

FIG. 4 is a sectional view taken on the line IV—IV in FIG. 2.

FIG. 5 shows a further embodiment of the adjusting mechanism for the closing member.

FIG. 6 shows a further embodiment of a closing member on the outlet of the device shown in FIG. 1.

FIG. 7 shows a detail of a control-member of the closing member on the front side of the device.

FIG. 8 is an elevation of the detail of FIG. 7 in the direction of the arrow VIII.

FIG. 9 shows a sectional view of a safety member of a device for taking up and delivering liquid material.

FIG. 10 is a side elevation of the device of FIG. 9.

FIG. 11 is a vertical sectional view of a second embodiment of a safety member for use in a device for taking up and delivering liquid material.

FIG. 12 is an elevation of the device of FIG. 11 taken in the direction of the arrow XII.

FIG. 13 is a side elevation of the clamping mechanism shown in FIG. 12.

Figure 1:
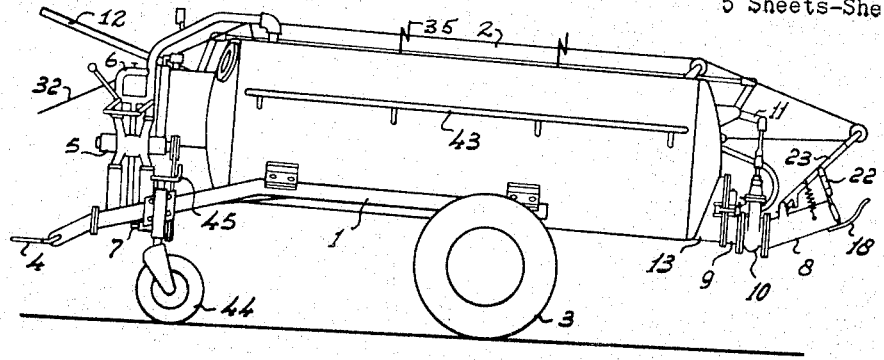
FIG. 1 is a side elevation of a device for distributing thick liquids.
Figure 2:
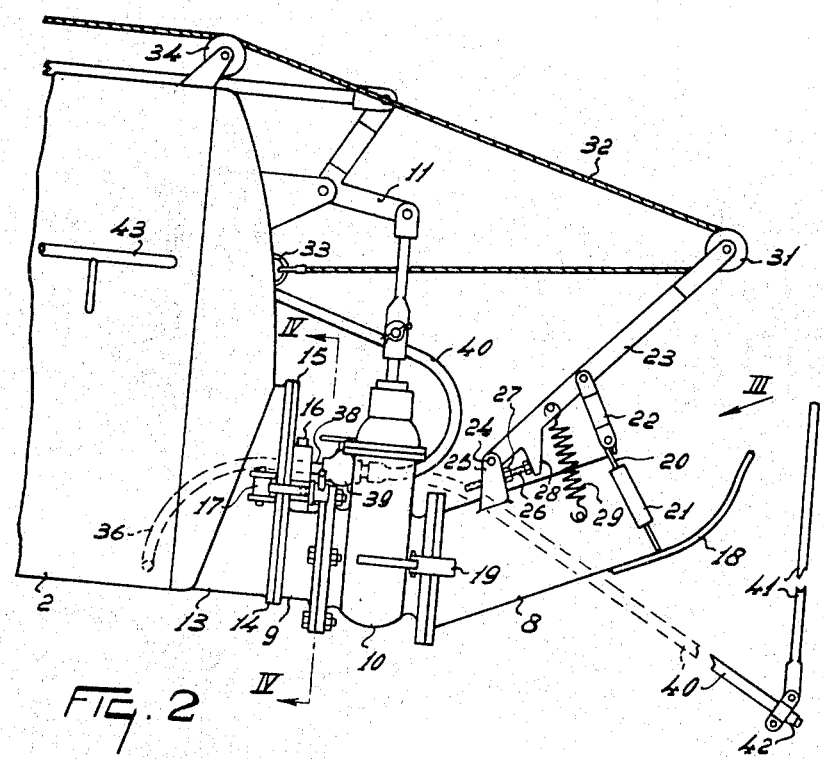
FIG. 2 shows on an enlarged scale a side elevation of the rear part of the device shown in FIG. 1.

The device shown in FIGS. 1 to 5 comprises a frame 1, on which a cylindrical liquid container 2 is arranged. The frame 1 has two ground wheels 3, only one of which is shown in FIG. 1. On the front side the frame 1 is provided with a drawbar 4, by means of which the device can be coupled with a vehicle, for example a tractor, propelling the device. On the front side the frame 1 has a pump 5, which communicates with the container 2 through ducts 6. The pump 5 is connected with a shaft 7, which can be coupled with the power take-off shaft of the tractor moving the device. On the rear side of the liquid container 2 there is provided a distributor formed by an outlet pipe 8 with a distributing plate 18. The distributor communicates with an outlet 9 of the container. The outlet 9 comprises a closing member 10, which is coupled by means of a rod system 11 with an actuating arm 12 on the front side of the device. On the rear side of the container 2 there is provided a cylindrical outlet nozzle 13 with a flange 14. Near the outlet 13 there is connected a lid 15, which is adapted to pivot about a shaft 16, which is secured to the container 2. The outlet 13 is provided with a locking bolt 17, by means of which the lid 15 can be clamped against the flange 14. The outlet 9 is connected with the lid 15. The outlet pipe 8 with the distributing plate 18 is connected with the outlet 9 by means of a quick release 19. The end of the spraying nozzle 8 is provided with a closing member formed by a slide 20, which is adapted to be moved between guides 21. An arm 22 is pivoted to the upper side of the slide 20. The arm 22, in turn, is pivoted to a lever 23, which is afforded by the shaft 24. The shaft 24 is secured to supports 25, which are fastened to the outlet pipe 8. An adjustable stop 26 is fastened to the supports 25, said stop being formed by a bolt 26 with a nut 27 by which the bolt can be fixed in a plurality of positions relative to the support 25. The lever 23 has a cam 28, which cooperates with the stop 26. The spraying nozzle 8 is provided with tension springs 29, which form energy-supplying members and are fixed to the lever 23. The end of the lever 23 is provided with a guide roller 31, along which a control-cable 32 is stretched. One end of the cable 32 is secured to a hook 33 on the rear side of the container. The other end of the cable 32 is taken along guide rollers 34 and through hooks 35 to the front of the device, where it can be actuated by the driver of the tractor.

The lid 15 is provided with a pipe 36, which forms an auxiliary outlet and extends by a curved end to the bottom of the container 2. The end 38 of the pipe 36 is provided with a cock 39, with which a hose 40 is coupled, the length of which may be equal to the length of the container 2. To the end of the hose 40 there is fastened a bar 41 and a spraying nozzle 42.

When the device is put in operation, it is coupled with the tractor by the drawbar 4 and the shaft 7 is linked to the power take-off shaft of the tractor. Through the shaft 7 the pump 5 can be caused to rotate and in accordance with the position of a cock system (not shown) in the ducts 6 the container 2 is emptied or exposed to pressure. In order to fill the container 2 the outlet pipe 8 is removed from the device and a suction hose (not shown) is connected with the outlet 9 by means of a quick release 19. The outlet pipe 8 may be put on one of the stands 43, provided one on each side of the container 2. This can be carried out in a simple manner, since the adjusting mechanism for the slide 20 is arranged on the outlet pipe 8 and is actuated via a cable. By sucking air out of the container 2 by means of the pump 5, the container 2 is filled through the suction hose. When the container 2 is full, the closing member 10 can be closed, after which the suction hose can be detached and the outlet pipe 8 can be re-arranged in place.

The liquid sucked into the container 2 can be conducted out of the container by pumping air through the pump 5 into the container 2, so that the liquid is sprayed out under pressure through the outlet pipe 8. The closing member 10 can be fully opened for spraying out the liquid. The quantity of liquid to be distributed per unit of length to be covered or per unit time can be controlled by means of the slide 20. The end of the outlet pipe 8 can be shut by the slide 20 to a greater or lesser extent. The position in which the slide 20 is held is determined by the position of the stop 26, on which the cam 28 of the lever 23 is held by the springs 29 and 30. In the position shown in FIG. 2 the outlet pipe is completely closed by the slide 20. The stop 26 can be adjusted so that the slide 20 leaves the end of the outlet pipe 8 wholly or partly opened, the position of the slide 20 being determined through the lever 23 by the stop 26, since the springs 29 and 30 urge the cam 28 against the stop 26. The stop 26 and the lever 23 with the cam 28 and the cable 32 thus constitute an adjusting mechanism for the closing member 20.

When the slide 20 releases the opening of the outlet pipe only partly, the material to be spread may become clogged in front of the slide, if it contains a lump of slush or some thick plug. In order to allow the lump to pass through the opening of the outlet pipe, the slide 20 can be shifted upward by exerting a pull on the cable 32 against the force of the springs 29 and 30. The opening of the outlet pipe is thus released completely, so that the lump can leave the outlet pipe. The cable 32 can then be loosened so that the slide 20 returns into its initial position under the action of the springs 29 and 30, which position is given by the stop 26. The force required to lift the slide 20 against the force of the springs 29 and 30 may be small by a suitable choice of the length of the arm 23 with respect to the distance between the shaft 24 and the place of application of the springs 29 and 30 on the arm 23. The required force is further reduced by taking the cable 32 via the guide roller 31 to the hook 33. The lever 23 with the cable 32 and the springs 29 and 30 constitutes a quick-action control-member for the slide 20.

The device is particularly suitable to distribute thick-liquid material such as liquid manure and slush. It will be obvious that the cock 39 must be closed when liquid material is sucked in and distributed through the outlet pipe 8. The cock 39 and the hose 40 may be employed, if thin liquid, for example water, has to be sprayed in small quantities. The closing member 10 can be kept in the closed position and the liquid in the container 2 can be sprayed through the cock 39 and the hose 40. It is furthermore possible to spray out air introduced into the container through the hose 40. This may be useful if liquid manure has to be sucked up into the container out of a pit. Before the manure is sucked up, the hose 40 can be held in the pit by means of the bar 41 so that compressed air is sprayed out of the container 2 via the hose 40, the manure being thus loosened to some extent, so that it can be sucked up more readily. The cock 39 can be closed before suction is exerted and the suction hose can be fastened to the outlet 9 by means of the quick release 19. When the hose 40 is not employed, it can be put in one of the stands 43.

When the device is not attached to a tractor, it can bear on the ground wheels 3 and a wheel 44 at the front of the device, which wheel can be adjusted in a direction of height by means of a screw spindle 45 with respect to the frame. When the device is coupled with a tractor, the wheel can be moved upwards relatively to the frame. The outlet 10 and the outlet pipe 36 can be readily cleaned by opening the lid 15.

FIG. 5 shows a further embodiment in which the slide 20 is actuated by a piston 46 in a cylinder 47. The cylinder 47 can communicate for this purpose through hoses 48 and 49 with an air container. During the distribution of the material this air container may be held under pressure by the pump 5, so that air is always available for controlling the piston 46. In order to open the slide 20, air is blown through the hose 49 below the piston 46, and in order to close the slide 20 wholly or partly, air can be introduced through the hose 48 above the piston 46. The supply of air through the hoses 48 and 49 may be controlled for example by means of cocks that can be actuated from the seat on the tractor, which is not shown in detail. A stop 51 is coupled with the slide 20 in order to hold the slide in a given position under the pressure of air above the piston 46. The stop 51 cooperates with the upper side of the outlet pipe 8. The stop 51 is adjustable so that the position in which the slide 20 has to be held can be varied in operation. The piston 46, exposed to pressure, constitutes in this embodiment the energy supplying member which holds the slide 20, in a position determined by the stop 51.

FIGS. 6, 7 and 8 show a further embodiment, in which the closing member 10 is provided with only a short outlet pipe 53 by means of a quick release 19. The outlet pipe 53 may be replaced by a suction hose for filling the container. The outlet pipe 36 of this embodiment is not provided with a hose, but it is closed by a cap 37. In this embodiment the closing member 10 is provided with a sliding bar 54, with which two draw springs 55 and 56 are coupled, which tend to hold the sliding rod 54 and hence the closing member 10 in the down position. The sliding bar 54 is coupled by means of a rod 57 with a control-member 58 (see FIGS. 7 and 8). The set of rods is constructed so that the arm 58 can be readily actuated against the action of the springs 55 and 56. The control-arm 58 is adapted to turn about a shaft 59 and to move along a guide 60 which is provided with an adjustable stop 61 and a fixed stop 62. The stop 62 determines the position of the arm 58, when the slide 10 is completely closed under the action of the springs 55 and 56. The stop 61 determines the position in which the slide 10 is wholly or partly opened. The arm 58 is urged by the springs 55 and 56 against the stop 61. The quantity of liquid to be distributed per unit length to be covered or per unit time can thus be adjusted by means of the stop 61.

If, as stated above, with reference to the preceding embodiment, a lump in the material is withheld by the slide, the latter can be rapidly opened by actuating the arm 58, which then turns in the direction of the arrow 63 about the shaft 59. When the lump has disappeared from the outlet, the arm 58 can be released so that it is again urged against the stop 61 by the springs 55 and 56. If the slide 10 has to be closed completely, the arm 58 can be moved slightly to one side in the direction of the arrow 64 (FIG. 8), so that it can move along the stop 61 towards the stop 62. In order to permit the lateral movement of the arm 58 it is arranged with some amount of clearance around the shaft 59 and is subjected to the stress of a pressure spring 65, which surrounds the shaft 59. The spring 65 tends to hold the arm in a position in which it cannot move past the stop 61. The slide or closing member 10 of the latter embodiment is used at the same time as a shutter. Both in the first and in the second embodiments the slide moves downwards for closing the outlet of the liquid. The slide moves in the direction of that side of the outlet pipe on which the distributing plate 18, which forms the distributor proper, is arranged. The material is sprayed against the distributing plate 18 so that it leaves the device in a fan-like fashion. By arranging the closing member so that the free passage of the outlet pipe, irrespective of its size, is located invariably near the distributing plate, the liquid is always sprayed effectively against the distributing plate. To prevent a suction of the material through the ducts 6 into the pump 5 a safety member can be provided between the ducts 6 and the container 2 as shown by FIGS. 9–13.

FIGS. 9 and 10 show a safety member 4 serving to avoid that, when the container 2 becomes full, liquid material is sucked away through the suction duct 6. The safety mechanism 74 comprises a round tube 75, which is fastened to the upper side 72 of the container. Near the tube 75 a support 76 is provided, to which an arm 78 is rotatably secured by means of a nylon shaft 77. The arm 78 is provided with a float 79 and a valve 80, which is connected with the arm 78 so as to be rotatable about a shaft 82. The arm 78 is connected with the upper side 72 of the container 2 on the side of the tube 75 opposite the support 76 by means of a wire 83. The upper side of the tube 75 is provided with a closing cap 84, which bears on a closing ring 85. The ring 85 is secured to a bent-over portion 86 of the upper part of the tube 85. The bent-over rim 86 of the tube 75 supports a cage-shaped holder 87. The holder 87 is formed by two U-shaped rods 89, which are secured to each other and are turned through 180° relatively to each other. The cage-shaped holder 87 comprises stay members 90, by means of which it bears on on the bent-over portion 86 of the tube 75. Inside the cage-shaped holder 87 a ball-shaped closing member 91 is provided between the upwardly extending limbs of the U-shaped rods 89 to rest on their lower curved portions 88.

In operation the safety member operates as follows:

When the container 2 is empty, the closing member 91 bears on the bottom side of the cage-shaped holder 87, which is shown in FIG. 9. The float 79 then hangs on the wire 83. The valve 80 is free of the lower side of the tube 75. When the suction mechanism is actuated, air is sucked out of the container 2 through the suction tube 6. Through a further inlet port (not shown in FIG. 9), for example on the lower side of the container 2, liquid material can then flow into the container 2. When the container 2 is filled, the float will float on the surface of the liquid material and thus moves upwards. The valve 80 is thus urged against the lower side of the tube 75, so that the suction port formed by the tube 75 is closed. The closing member 80 is adapted to adjust itself around the shaft 82 in order to fully engage the lower side of the tube 75. The float 79 forms the control-member of the closing member 80. The material can thus not be sucked away through the suction tube 6. It is thus avoided that liquid gets into the suction mechanism. Penetration of liquid into the suction mechanism is undesirable, since it may give rise to damage of the suction mechanism.

If liquid material is sucked in, which may contain solid pieces or less liquid material, said pieces may get in between the valve 80 and the lower side of the tube 75. The seal provided by the valve 80 on the tube 75 would thus become defective, so that material could penetrate into the tube 75. The ball-shaped closing member 91 has such a form and is made of such material that it floats on the liquid. The closing member 91 is therefore moved upwards by the material, so that it closes the inlet port of the tube 75, the material being thus prevented from penetrating into the tube 75.

The closing member 91 thus provides an additional safeguard for material not being sucked in through the suction tube 6. The device is particularly suitable for working thick-liquid material containing solid pieces and other impurities.

The closing cap 84 is urged against the ring 85 by means of bolts 92. The bolts 92 are fastened to a ring 93, which is secured to the tube 75. The upper sides of the bolts 92 hook around a rim 94 of the closing cap 84. For cleaning purposes the closing cap 84 can be readily removed by taking off the bolts 92, which can be actuated by means of a lever 95. The lever 95 is adapted to turn about a shaft 96 connected with the ring 93 and by means of a shaft 97 the bolts 92 are rotatably connected with the lever 95. When the cap 84 is removed, the member 87 and the closing member 91 can be taken off the tube 75.

In the embodiment shown in FIGS. 11, 12 and 13 the upper side 72 of a container 2 is provided with a safety device 98, to which the suction duct 6 is secured. The device 98 comprises a ring 100, secured to the upper side 72. The upper side of the ring 100 has a supporting rim 101, on which a cage-shaped holder 102 is suspended. The cage-shaped holder 102 comprises a ring 103 with four downwardly projecting rods 104, the lower ends 105 of which are bent over towards each other. Inside the rods 104 a ball-shaped closing member 106 is provided. A ring 107 fits to the support 101 and a stuffing ring 108 is provided between the ring 107 and the support 101. A tube 109 is secured to the ring 107, said tube forming a first portion of the suction duct and having its lower end accommodated inside the arms 104. The upper side 110 of the tube 109 is bent over laterally through about 90°. The bent-over end 110 of the tube 109 is provided with a holder 111 consisting of a plurality of rods 112, arranged obliquely to each other; a ball-shaped float 113 can bear thereon. The ring 107 supports the rim 115 of a supporting ring 114 of a container 116. The ring 107 bears through a stuffing ring 108 on the ring 101. The upper side of the container 116 is provided with the suction tube 6. At the lower end of the suction tube 6 there is provided a guide 118, which grips around the float 113.

The container 116 is provided with fastening members 119, to which clamping mechanisms 120 can be secured for clamping the container 116 to the supporting ring 101.

When liquid is sucked into the container 2, the air is sucked out of the container through the tube 109 and the suction tube 6. The suction tube 6 can for this purpose be connected with a suction pump. When the container 2 is filled, the closing member 106, which serves at the same time as a float, will float on the sucked-in liquid, so that it moves upwards and comes into contact with the lower side of the tube 109. The tube 109 is thus cut off. The float-closing member 106 has a spherical shape and the inlet port of the tube is circular. If any solid pieces carried along with the liquid get between the tube 109 and the closing member 106, liquid can be sucked through the tube 109. The material sucked through the tube 109 then arives in the container 116. The upper end 110 of the tube 109 is bent over so that any impurities conveyed by the liquid get into the container 116 at the side of the closing member 113. When the liquid gets into the container 116, the closing member 113, which serves at the same time as a float, is lifted by the liquid so that the suction tube 99 is cut off by the closing member 113. The closing member 113 thus forms a second safeguard for liquid not being sucked in through the suction tube 99. The guide 118 guides the closing member 113 in a correct manner towards the lower side of the tube 99, like the rods 104 guide the closing member 106 in the correct manner towards the lower side of the tube 109. Any impurities in the liquid sucked in through the tube 109 will not get easily into the interior of the guide 118, since the upper end 110 of the tube 109 is bent over, so that there is practically no risk of solid impurities of the liquid hindering cutting-off of the suction tube 99 by the closing member 113. The closing members 106 and 113 each form a closing member and a control-member as is described above for the closing member 91. The control-member may be constructed in a different form so that it actuates the closing member or both the closing members for cutting off the suction path. The auxiliary container 116 may, if desired, have transparent walls 121 and 122, so that it can be seen whether there is liquid in the container 116. When the two opposite walls are transparent an improved view of any liquid in the container 116 is obtained.

In order to clean the safety device 98 the container 116 can be removed by detaching the fastening members 120. When the container 116 is removed, the float 113, like the tube 109, is freely accessible. The float 113 and the tube 109 can also be taken off, when the container 116 is off and the cage-shaped guide 104 can then be removed from the ring 101. The closing members 106 and 113, like the closing member 88 and the valve 80, are made of a material that is not attacked by the liquid to be worked.

The device is particularly suitable for use in an apparatus for sucking in liquid manure or slush. As described herebefore, the suction tube 6 may also be used for exerting pressure on the liquid in the container 2. The tube 6 is then connected with a compressing apparatus so that air can be pressed into the container 2. The material contained in the container 2 can thus be conducted away under pressure and be sprayed for example via a suitable delivering member for distribution on a broad strip. The suction mechanism may then be a pump, while through a cock system the tube 6 can be connected both to the suction side and to the compression side of the pump.

What I claim is:

1. A device for taking up and spreading liquid, comprising a container for liquid material, an outlet opening provided near the bottom side of said container, an adjustable closing member associated with said outlet opening, a distributor communicating with the outlet opening, said closing member being connected to an adjusting mechanism for holding the closing member in a selected one of a plurality of settings, said adjusting mechanism including a quick action control member for moving said closing member from its selected setting to a completely open position, said adjusting mechanism including an adjustable stop which determines the setting in which the closing member is held and an energy-supplying member which acts upon said closing member to urge same in its selected setting, a pump mechanism being connected to said container whereby air can be pumped into and out of said container, said distributor being detachably connected whereby same is replaceable relative to said outlet opening by a suction hose.

2. A device as claimed in claim 1, wherein said energy-supplying member comprises a cylinder in which a piston is provided, said piston being connected with said closing member, said cylinder communicating on either side of said piston with a pump whereby air can be pressured on each side of said piston for movement in said cylinder.

3. A device as claimed in claim 1, wherein said container has an outlet pipe and said closing member is a slide at one end of said pipe, said slide extending parallel to a plane intersecting the longitudinal axis of said outlet pipe at an acute angle.

4. A device as claimed in claim 1, wherein said closing member is connected through a set of rods with a control-arm, said arm being movable and associated with a guide having an adjustable stop for said control-arm.

5. A device as claimed in claim 4, wherein said closing member is a slide on an outlet for said container and said distributor communicates with said outlet.

6. A device as claimed in claim 1, wherein said outlet opening is located on a lid on the container.

7. A device for taking up and delivering liquid, comprising a container for liquid material, an outlet opening near the bottom side of the container, closing means associated with said outlet opening to close and open said outlet opening, a distributor detachably connected from said outlet opening and closing means whereby said distributor is replaceable by a suction hose, said distributor including an outlet pipe, an adjustable closing member connected to said outlet pipe, an adjusting mechanism associated with said closing member for holding same in a plurality of selected settings, said adjusting mechanism including a quick-action control member for moving said closing member from its selected setting to a completely open position, and a pump mechanism connected to said container whereby air can be pumped into and out of said container.

8. A device as claimed in claim 7, wherein the closing member includes a slide fitted at one end of an outlet pipe, said outlet pipe positioned between said container and said distributor.

9. A device as claimed in claim 8, wherein said slide is pivotably connected to a lever, said lever being urged against an adjustable stop under the action of an energy-supplying member.

10. A device as claimed in claim 9, wherein said lever is provided with a guide and a control cable and said cable is passed through said guide to a fastening point on the device.

11. A device as claimed in claim 9, wherein the energy-supplying member consists of at least one draw spring.

12. A device as claimed in claim 9, wherein one end of said lever is pivoted to the outlet pipe.

13. A device as claimed in claim 9, wherein said lever is connected with two draw springs, which are arranged on opposite sides of said outlet pipe.

14. A device as claimed in claim 7, wherein said distributor is supported on said outlet pipe.

15. A device as claimed in claim 7, wherein said distributor is a distributing plate against which the liquid is sprayed under pressure from the container, said distributor being connected to that side of said outlet adjacent said closing member.

16. A device as claimed in claim 7, wherein said pump communicates with said container through conducting means and a safety device is positioned between said conducting means and said container, said safety device comprising a closing element and a control member, said control member actuating said closing element to cut off the suction path of said conducting means.

17. A device as claimed in claim 16, wherein said control member is a float connected with a rod which is turnable about a shaft and said control member is adjustably coupled with said rod.

18. A device as claimed in claim 16, wherein said control member is a float which is urged by the liquid to move along a guide against an inlet port in the suction path, said float also comprising a control member.

19. A device as claimed in claim 18, wherein said float has a spherical shape and the suction path is provided with a circular inlet port.

20. A device as claimed in claim 19, wherein said guide is enclosed between a support on the upper side of the container and a suction duct.

21. A device as claimed in claim 16, wherein a second safety device having a second closing element arranged between the suction mechanism and the first mentioned closing element.

22. A device as claimed in claim 21, wherein an auxiliary container is positioned between the suction path and said first mentioned closing element.

23. A device as claimed in claim 21, wherein said first mentioned closing element includes a duct, a first portion and a further part in said duct, one end of further part being located adjacent said second closing element, said one end being bent away from said first closing element.

24. A device as claimed in claim 23, wherein said further part of said duct is bent over at the end remote from said container whereby said end opens in the space between said two closing elements.

25. A device as claimed in claim 21, wherein said safety device includes a float provided with a stop which limits the movement of said float away from said suction path.

26. A device for taking up and spreading liquid, comprising a container for liquid material, an opening near the bottom side of said container, a lid to close said opening, an outlet opening provided adjacent said lid, an adjustable closing member near said outlet opening, a distributor communicating with said outlet opening, said closing member being connected to an adjusting mechanism for holding the said closing member in a plurality of selected settings, said adjusting mechanism including a quick-action control member for moving said closing member from a selected setting to a completely open position, said distributor being removable and replaceable with a suction hose, a pump connected to said container whereby air can be pumped into and out of said container, conducting means between said pump and said container, a safety device being positioned between said conducting means and said container, said safety device including a closing element and a control member, said control member actuating said closing element to cut off the suction path of said conducting means, an auxiliary pipe connected to said container, said auxiliary pipe having a portion in said container whereby the end of said portion is situated near the bottom of said container, said auxiliary pipe being provided with a cock to close and open said auxiliary pipe.

27. A device as claimed in claim 7, wherein said container is provided with an auxiliary outlet, through which liquid can be conducted out of the container.

28. A device as claimed in claim 27, wherein said auxiliary outlet is forked by a pipe, one end of which is located inside said container near the bottom thereof.

29. A device as claimed in claim 28, wherein a hose is connected with said auxiliary outlet and a cock is positioned between said hose and said outlet.

30. A device as claimed in claim 29, wherein a valve arm is provided at the end of said hose.

31. A device as claimed in claim 29, wherein said outlet is located on a lid and an auxiliary outlet is also provided on said lid.

32. A device for taking up and delivering liquid material, said device comprising a container for the liquid material, a pump mechanism connected to said container whereby air can be pumped into and out of said container, conducting means between said pump and said container, a safety device being positioned between said conducting means and said container, said safety device comprising a closing element and a control member, said control member actuating said closing element to cut off the suction path through said conducting means of the container when liquid material sucked in said container by said pump mechanism reaches the suction path of said container, said conducting means having a second closing element coupled with a second control member to cut off the suction path of said container when liquid material is passed through said first closing element, said container having an outlet and an outlet closing member connected to said outlet, a distributor positioned adjacent said outlet whereby said closing member is interposed between said outlet and said distributor, said distributor being removable and replaceable with a suction pipe whereby liquid material can be sucked in the container through said outlet pipe.

33. A device as claimed in claim 32, wherein the first mentioned closing element is located on the upper side of the container.

34. A device as claimed in claim 33, wherein said second closing element comprises a closing float adapted to move via a guide unit between the inlet port of a suction tube and a support, said closing float bearing on said support when it is free of the liquid.

35. A device as claimed in claim 34, wherein said first mentioned closing element is a float arranged inside a cage-shaped guide.

36. A device as claimed in claim 34, wherein said closing float is arranged inside a cylindrical guide.

37. A device as claimed in claim 33, wherein said second closing element is arranged on a support element and said support element is removable from the container, said first mentioned closing element being secured at least in part to said container through said support element.

38. A device as claimed in claim 37, wherein said support element is secured to said container by means of a quick-release.

39. A device as claimed in claim 32, wherein said second element is located inside the auxiliary container.

40. A device as claimed in claim 32, wherein an auxiliary container is positioned between the suction path and said first mentioned closing element, said auxiliary container having a transparent wall.

41. A device as claimed in claim 32, wherein an auxiliary container is positioned between the suction path and said first mentioned closing element, said second closing element being located inside the auxiliary container, said first mentioned closing element including a duct, one end of said duct being positioned in said auxiliary container and the other end of said duct being arranged in said container, said conducting means including a further duct coupled with one end to said auxiliary container, the said one end of said duct in said auxiliary chamber being directed away from said further duct of said conducting means.

References Cited

UNITED STATES PATENTS

| | | | |
|---|---|---|---|
| 1,673,348 | 6/1928 | Czerner | 141—59 X |
| 2,495,905 | 1/1950 | Pogue | 141—59 X |
| 2,510,231 | 6/1950 | Juzwiak | 222—43 |
| 2,612,289 | 9/1952 | Koester | 222—159 X |
| 2,779,586 | 1/1957 | Schweiss | 251—285 |
| 3,064,861 | 11/1962 | Reynolds | 222—178 |
| 3,144,173 | 8/1964 | France et al. | 222—504 X |
| 3,145,057 | 8/1964 | Taggart | 222—504 X |

FOREIGN PATENTS 722,617   1/1955   Great Britain.

ROBERT B. REEVES, *Primary Examiner.*

HADD S. LANE, *Examiner.*